(12) United States Patent
Kuras et al.

(10) Patent No.: US 8,074,451 B2
(45) Date of Patent: Dec. 13, 2011

(54) ELECTRIC MOTOR ACTUATION OF A HYDROSTATIC PUMP

(75) Inventors: Brian D. Kuras, Metamora, IL (US);
Michael G. Cronin, Peoria, IL (US);
Frank A. DeMarco, East Peoria, IL (US); Mustafa Guven, Dunlap, IL (US);
Michael J. Barngrover, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 770 days.

(21) Appl. No.: 12/131,662

(22) Filed: Jun. 2, 2008

(65) Prior Publication Data
US 2009/0298635 A1     Dec. 3, 2009

(51) Int. Cl.
*F16D 31/02* (2006.01)
*F01B 3/02* (2006.01)
(52) U.S. Cl. .......................................... 60/487
(58) Field of Classification Search .............. 60/487
See application file for complete search history.

(56) References Cited

U.S. PATENT DOCUMENTS

| | | |
|---|---|---|
| 2,465,638 A | 3/1949 | Eckert |
| 3,733,970 A | 5/1973 | Bosch |
| 4,667,472 A | 5/1987 | Clay et al. |
| 4,875,390 A | 10/1989 | Hayashi et al. |
| 4,916,901 A | 4/1990 | Hayashi et al. |
| 5,205,201 A * | 4/1993 | Gollner ........................... 60/487 |
| 5,647,208 A | 7/1997 | Spitzbarth |
| 5,975,858 A | 11/1999 | Shimotomai |
| 6,155,798 A * | 12/2000 | Deininger et al. ............. 92/12.2 |
| 6,176,684 B1 | 1/2001 | Zimmermann |
| 6,385,970 B1 | 5/2002 | Kuras et al. |
| 6,544,004 B2 | 4/2003 | Fujii et al. |
| 6,655,255 B2 | 12/2003 | May |
| 6,951,164 B2 | 10/2005 | Ito et al. |
| 7,082,761 B2 | 8/2006 | Saitou et al. |
| 2007/0251229 A1 | 11/2007 | Nakatsuka et al. |

FOREIGN PATENT DOCUMENTS

| | | |
|---|---|---|
| JP | 05099201 | 4/1993 |
| JP | 10129282 | 5/1998 |
| JP | 2002156038 | 5/2002 |

* cited by examiner

*Primary Examiner* — Daniel Lopez
(74) *Attorney, Agent, or Firm* — Leydig, Voit & Mayer

(57) ABSTRACT

A hydraulic motor system for improved frequency response includes a hydraulic variator having a pump and a motor, wherein the pump includes a variable angle swash plate, and the system further includes an electric actuator for controlling an angle or torque of the swash plate, thereby controlling the motor output characteristics. The electric actuator for controlling the variable angle swash plate may comprise a linear electric motor, ball screw drive or a rotary electric motor. In an example, the rotary electric motor tilts the swash plate by applying a torque to the swash plate at a point away from its tilt axis. In a further example, the rotary electric motor tilts the swash plate via a worm drive or ball screw drive.

17 Claims, 8 Drawing Sheets

ELECTRIC MOTOR ACTUATION OF A HYDROSTATIC PUMP

TECHNICAL FIELD

This disclosure relates generally to hydrostatic pumps and, more particularly, to systems and methods for actuating the swash plate of hydrostatic pumps.

BACKGROUND

Hydrostatic pumps are devices that convert mechanical energy into fluid energy. Such pumps are typically used in combination with hydrostatic motors, with the combination being generally referred to as a variator as will be appreciated by those of skill in the art. Variators are employed in many power transmission or production devices and systems. An example of such a system is a continuously variable transmission (CVT).

This type of system can be seen in U.S. Pat. No. 6,385,970 to Kuras et al. In particular, this reference discusses the issue of lug or stall prevention. This condition occurs when the power demanded from the engine, e.g., because of a change in load or machine configuration, causes the engine to stall or severely slow down. The '970 patent notes that this condition may occur when the actuation of the hydrostatic elements of the system respond too slowly to effectively accommodate a changing environment. For example, if a bulldozer blade encounters sudden resistance, the power demand of the system will rise suddenly and dramatically, and the system may be unable to reduce the power demand in time to avoid a lug or stall condition.

The solution proposed in the '970 patent is an especially effective control scheme designed to provide a rapid response in the system elements. However, the system response frequency is ultimately still limited by its physical components. Thus, although the '970 solution eliminates much of the delay in the control system itself, the overall frequency response of the transmission will be hindered to some extent by the inertia and responsiveness of the system components such as the hydrostatic pump. In order to have a more accurately controlled transmission system, it is desirable to increase the responsiveness of the transmission and, in particular, the responsiveness of the hydrostatic pump.

Although the resolution of deficiencies of the prior art has been found by the inventors to be desirable, such resolution is not a critical or essential limitation of the disclosed principles. Moreover, this background section is presented as a convenience to the reader who may not be of skill in this art. However, it will be appreciated that this section is too brief to attempt to accurately and completely survey the prior art. The preceding background description is thus a simplified and anecdotal narrative and is not intended to replace printed references in the art. To the extent an inconsistency or omission between the demonstrated state of the printed art and the foregoing narrative exists, the foregoing narrative is not intended to cure such inconsistency or omission. Rather, applicants would defer to the demonstrated state of the printed art.

SUMMARY

In one aspect, the disclosure pertains to a hydraulic pump system for improved frequency response including a hydraulic variator with a pump and a motor. The pump includes a variable angle swash plate, and the system further includes an electric actuator for controlling an angle, speed, or torque/force of the swash plate, thereby controlling the motor output, e.g., its output torque. The electric actuator for controlling the angle, speed, or torque/force of the variable angle swash plate may be comprised of a linear electric motor or a rotary electric motor. In an example, the rotary electric motor tilts the swash plate by controlling a torque on the swash plate at a point away from its tilt axis. In another example, the rotary electric motor tilts the swash plate via a worn drive, linear electric motor, or an electric ballscrew actuator.

DETAILED DESCRIPTION

Figure 1:
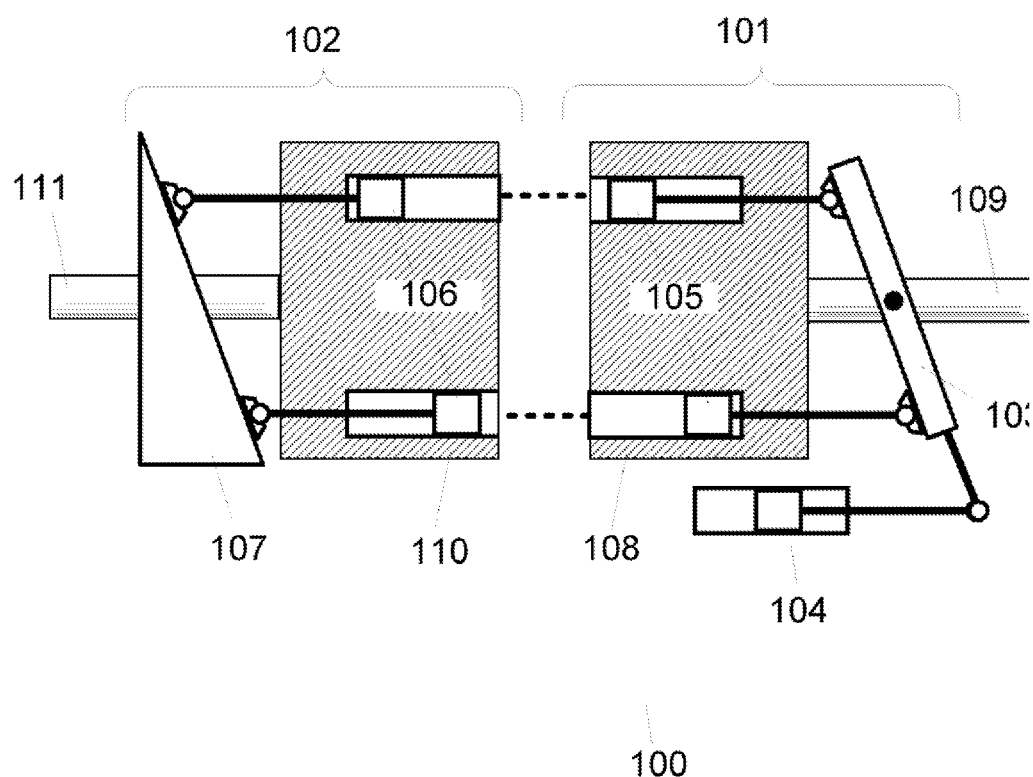
FIG. 1 is a detailed schematic drawing of a variator usable in conjunction with the disclosed principles.

Referring to FIG. 1, this figure shows a prior art hydraulically actuated variator 100. The illustrated variator 100 comprises a pump 101 and a motor 102. The pump 101 comprises a variable angle swash plate 103 set by a swash plate actuator 104. A number of pistons 105 in respective chambers ride on the swash plate 103 via sliding contacts, such that the range of movement of the pistons 105 is set by the angle of the swash plate 103. The chambers for the pistons 105 are formed in a pump carrier 108 that is rotated via the pump input shaft 109.

The motor 102 comprises a similar arrangement including a number of pistons 106 in respective chambers. The pistons 106 of the motor 102 are slidably engaged upon a fixed swash plate 107. It should be noted that the motor swash plate 107 may be variable rather than fixed in an implementation. The chambers of the pistons 105 of the pump 101 are in fluid communication with the chambers of the pistons 106 of the motor 102 via hydraulic fluid that fills the chambers and intervening conduits (not shown). The chambers for the pistons 106 are formed in a motor carrier 110 that rotates the motor output shaft 111. As the angle of the swash plate 103 is varied, the amount of fluid displaced by the pistons 105 of the pump 101 (and thus the fluid volume received or taken from the chambers of the pistons 106) varies.

As noted above, it is desirable to control the motor 102 output, and in an embodiment, it is desired to control the output torque of a hydromechanical transmission. This approach provides an improved operator feel and control, as opposed to speed control techniques. Output torque control requires controlling the force/torque applied to the swash plate 103 as well as measuring the circuit pressure within the variator 100 to ensure that the output torque matches the desired torque output reasonably well as will be discussed in greater detail below.

Because of these interrelationships, the torque and/or output speed of the motor 102 varies in an essentially proportional manner with respect to the angle of and/or force applied to, respectively, the swash plate 103. The swash plate actuator 104, which in this example operates on differential hydraulic pressure, is driven via solenoid valves (not shown), e.g., one for each of two pressure values, controlled electronically by a controller, although it will be appreciated from this description that there are numerous other ways to electronically control the hydraulic actuator 104. Thus, traditionally, the controller is able to control the output speed or torque of the variator 100 via the application of electrical signals to solenoid valves associated with the swash plate actuator 104.

However, the frequency response of the variator 100 is limited in part by the frequency response of the actuator 104. The frequency response, e.g., the maximum rate of variation, of the actuator 104 is a function of both its structure and its power supply. With respect to the structure, the actuator 104 comprises a piston, rod and linkage to the swash plate 103. Each of the these components imparts inertia to the system that must be overcome by the actuating power source, which in the illustrated example is hydraulic fluid.

Moreover, the flow of hydraulic fluid in and of itself is also frequency limited, and thus also impacts the frequency response of the actuator 104. The hydraulic circuit leading to and from the actuator 104 is comprised of valves, tubes, orifices, and other elements each of which imparts viscous resistance. Since the flow resistance of a viscous fluid around and through such elements is not merely proportional to flow rate, but rises exponentially with flow rate, the hydraulic fluid itself has a strong frequency limiting effect on the system.

Figure 2:
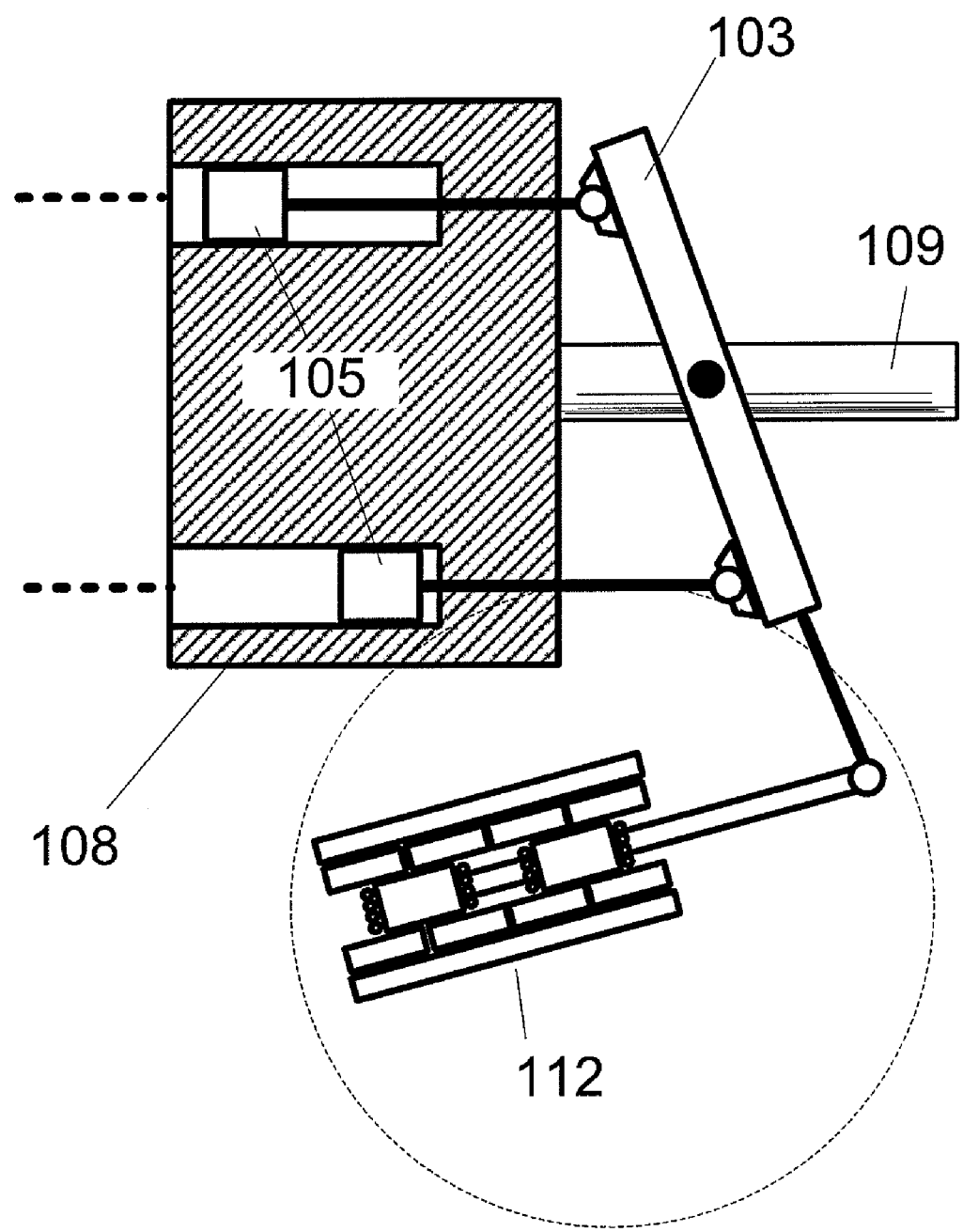
FIG. 2 is a schematic drawing of a variator employing a linear electric actuator in accordance with the disclosed principles.

In order to provide a more accurate machine control system, e.g., for purposes of power control, underspeed/overspeed control, etc., it is desirable to increase the rate of response of the system by improving the response characteristics of the hydrostatic pump or variator 100. Thus, in accordance with this disclosure, the swash plate 103 is actuated via an electronic actuator controlled by a feedback control loop to accurately drive the variator 100. As shown in the illustrative example of FIG. 2, the swash plate may be actuated via a linear electric motor 112. The linear electric motor 112 is an electric motor with linearly arrayed stator elements such that the motor produces a linear force along its length rather than a torque as with an ordinary rotary motor. Although there are different types of linear motors, any of which may be used in accordance with the disclosed principles, an exemplary motor is a Lorentz actuator in which the force exerted by the motor is linearly proportional to the applied current.

Figure 3:
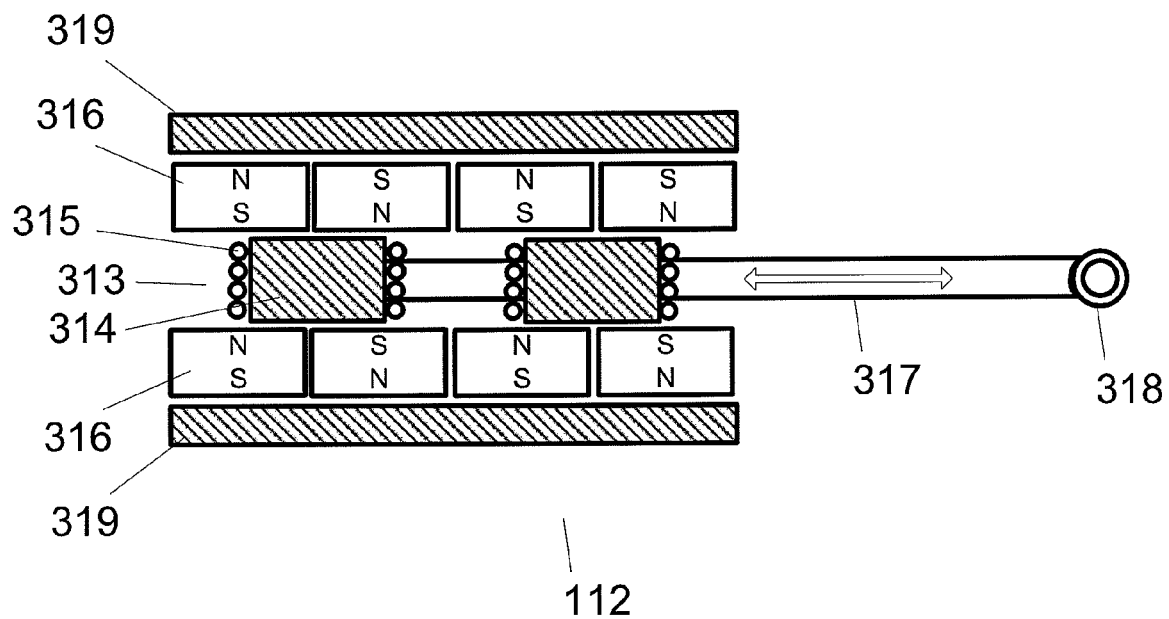
FIG. 3 is a schematic drawing of a linear electric actuator.

FIG. 3 shows the linear electric motor 112 in greater detail. The linear electric motor 112 includes two force elements 313. Each force element 313 includes a core 314 and an active winding 315. The force elements 313 are linked by a rod 317 that extends to one side of the linear electric motor 112. The rod 317 terminates in an eye 318, link, clevis or other device for connecting the rod 317 to the swash plate 103 (not shown in FIG. 3).

The linear electric motor 112 further includes an array of permanent alternate-pole magnets 316 on each side of the set of force elements 313. A ferrous shell 319 is disposed outward of each array of magnets 316 so as to complete the magnetic circuit formed thereby. The windings 315 are energized in sequence, the force elements 313, and hence the rod 317, are forced to the left or the right. When the eye 318 is linked to the swash plate 103, the linear movement of the rod 317 is translated into rotation of the swash plate 103.

Although the arrangement illustrated in FIG. 3 employs permanent magnets 316 in the magnet arrays, it will be appreciated that electrically active magnets may additionally or alternatively be used. Moreover, although the linear electric motor 112 is described as linking directly to the swash plate 103 via a rod 317 and lever, it will be appreciated that a greater or lesser number of elements may be used in more or less complex arrangements without departing from the scope of the disclosed principles. For example, in the implementation of FIG. 2, the linear electric motor 112 may be replaced by a ball screw drive mechanism. Such a mechanism mechanically translates rotational motion to linear motion via a spiral ball bearing raceway that functions as a precision screw. Such mechanisms can be made to withstand elevated thrust loads, while exhibiting low internal friction, and are suitable for use high-precision applications.

Figure 4:
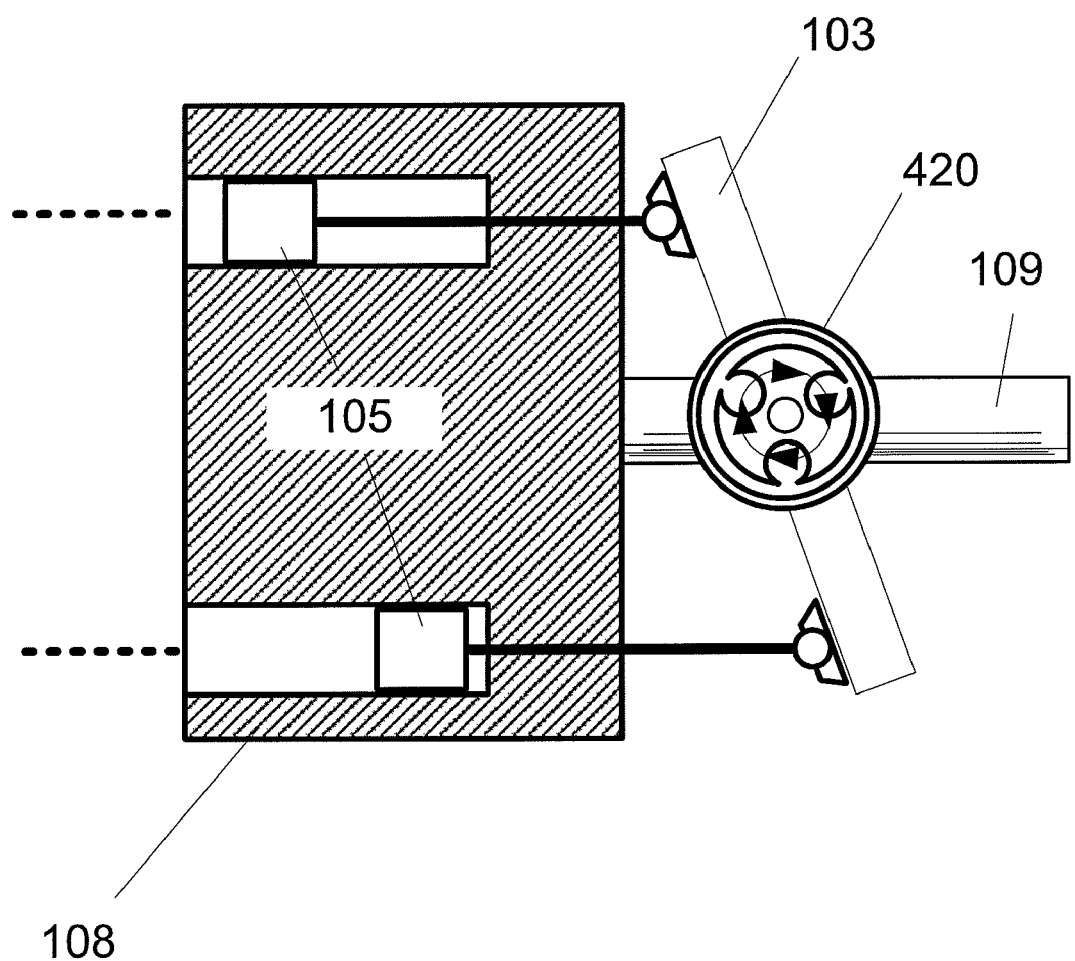
FIG. 4 is a schematic drawing of a variator employing an on-axis rotary electric actuator in accordance with the disclosed principles.

Although actuation of the swash plate 103 via the linear electric motor 112 or ball screw improves the frequency response of the system over the use of a hydraulic actuator, still better frequency response may be obtained, depending upon the components used, by employing a rotary motor 420 mounted on the swash plate 103 tilt axis as shown in FIG. 4. In order to provide the desired frequency response characteristics, the rotary motor 420 is ideally a low-inertia high-torque AC electric motor, as will be explained in greater detail below. In an alternative arrangement, the motor is a permanent magnet DC motor or a switched reluctance motor, or other suitable motor.

If a stroke range of +20° to −20° is desired within a transit time of 0.4 seconds, as reflects a suitably large rate of change to provide improved frequency response, the effective RPM of the swash plate 103 is about 17 RPM. If a 100/1 gear reduction is used between the rotary motor 420 and the swash plate 103, the resultant required motor speed is about 1700 RPM. Another parameter that affects the suitability of any rotary motor 420 is its physical size since it must fit within substantially the same space used by an ordinary actuator 104 if it is to be usable as a retrofit to the variator 100.

In addition to the speed requirement, the rotary motor or linear motor must be sized to meet the torque requirement dictated by the specified maximum stroke rate (or rotation rate) and the other torque reactions seen by the swash plate 103. These torques are a function of spring rate (e.g., for a swash counterbalance spring, not shown), the swash angle, the circuit pressure between the pump 101 and the motor 102, and the pump speed. These torque reactions refine the motor torque needed to apply a desired torque or force to the swash plate 103. The speed specifications, torque specifications, and the frequency requirements are used to select the motor and gear box to meet the given torque, speed, inertia/mass requirements. As part of this process, it is important to note that the motor inertia is reflected through the gearbox and this must be accounted for in the motor selection process.

Having described a variator system in general structural terms, we will now discuss the system and its control components in keeping with the disclosed principles. The disclosed principles entail the electrical actuation of the swash plate 103, and as such, components of the system will require electrical power. In an example, the system DC bus voltage is used. This voltage will typically be about 12 volts or about 24 volts in construction machines, depending upon the battery configuration of the machine.

The following discussion explicates an example of the structure and control of a variator in keeping with the disclosed principles. During operation, the machine will typically begin at rest. When the operator desires to increase the speed or torque of the output 111 of the hydraulic motor 102. To achieve this, power is drawn from the DC bus (or from one or more batteries, an up/down converter or from an alternative electrical power source), to apply a speed or torque at an electric motor. When the desired hydraulic motor 102 torque or speed is achieved, power remaining in the swash plate 103 and associated components may be regenerated, e.g., back onto the DC bus, and stored for later use. Alternatively, excess power may also be dissipated in a resistive grid or other element.

Although a rotary motor mounted on, or geared to, the tilt axis of the swash plate 103 may be used to provide the desired response as described above, a rotary motor may be used in alternative arrangements as well, while still providing improvement over the use of a standard hydraulic actuator 104. For example, if space constraints, lack of materials, or other complications prevent the use of the arrangement shown in FIG. 4, a rotary motor may instead be externally mounted in much the same way as the linear electric motor 112.

Figure 5:
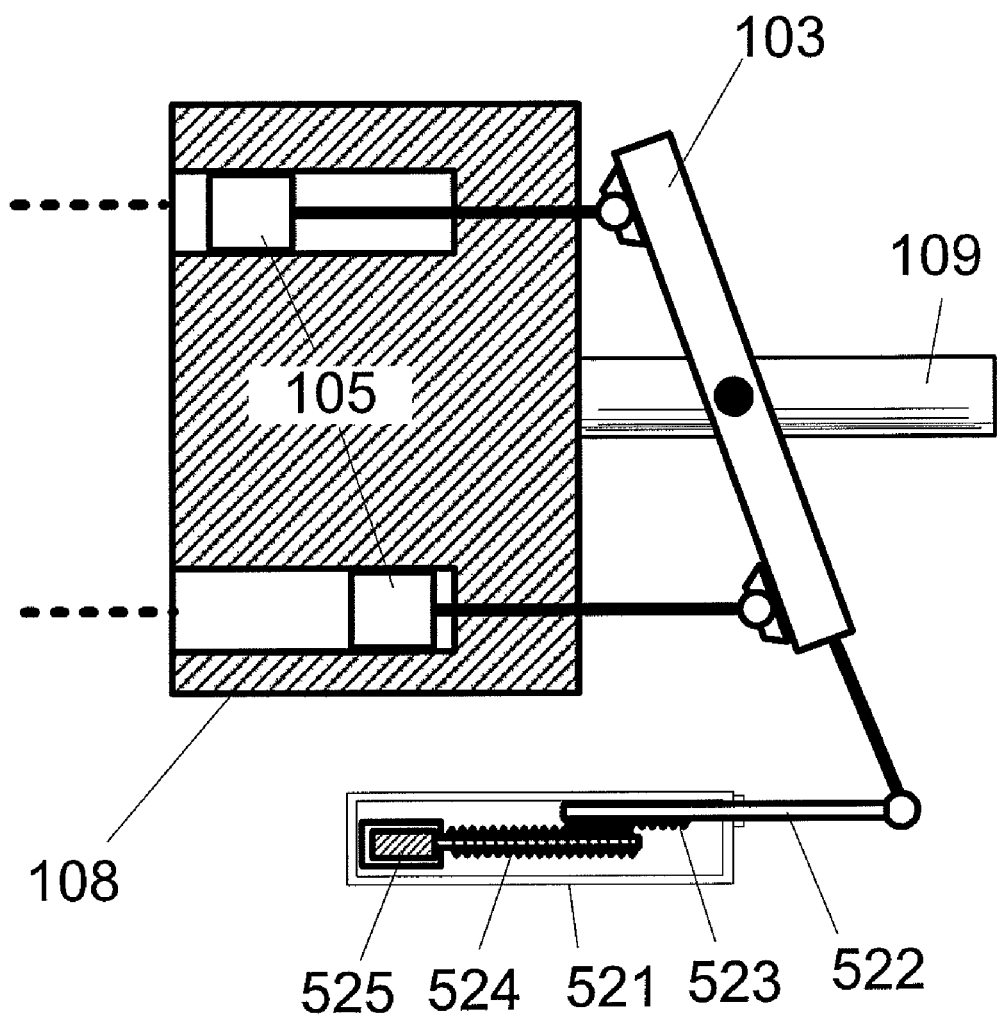
FIG. 5 is a schematic drawing of a variator employing a worm drive electric actuator in accordance with the disclosed principles.

In particular, as shown in FIG. 5, a worm drive module 521 is arranged so as to drive the swash plate 103 via a linking rod 522. The worm drive module 521 includes a rack 523 fixed to the linking rod 522. The rack 523 is cooperatively interleaved with the lands of a screw 524 so that rotation of the screw 524 causes the linking rod 522 to translate linearly. The screw 524 is turned via a rotary motor 525.

Figure 6:
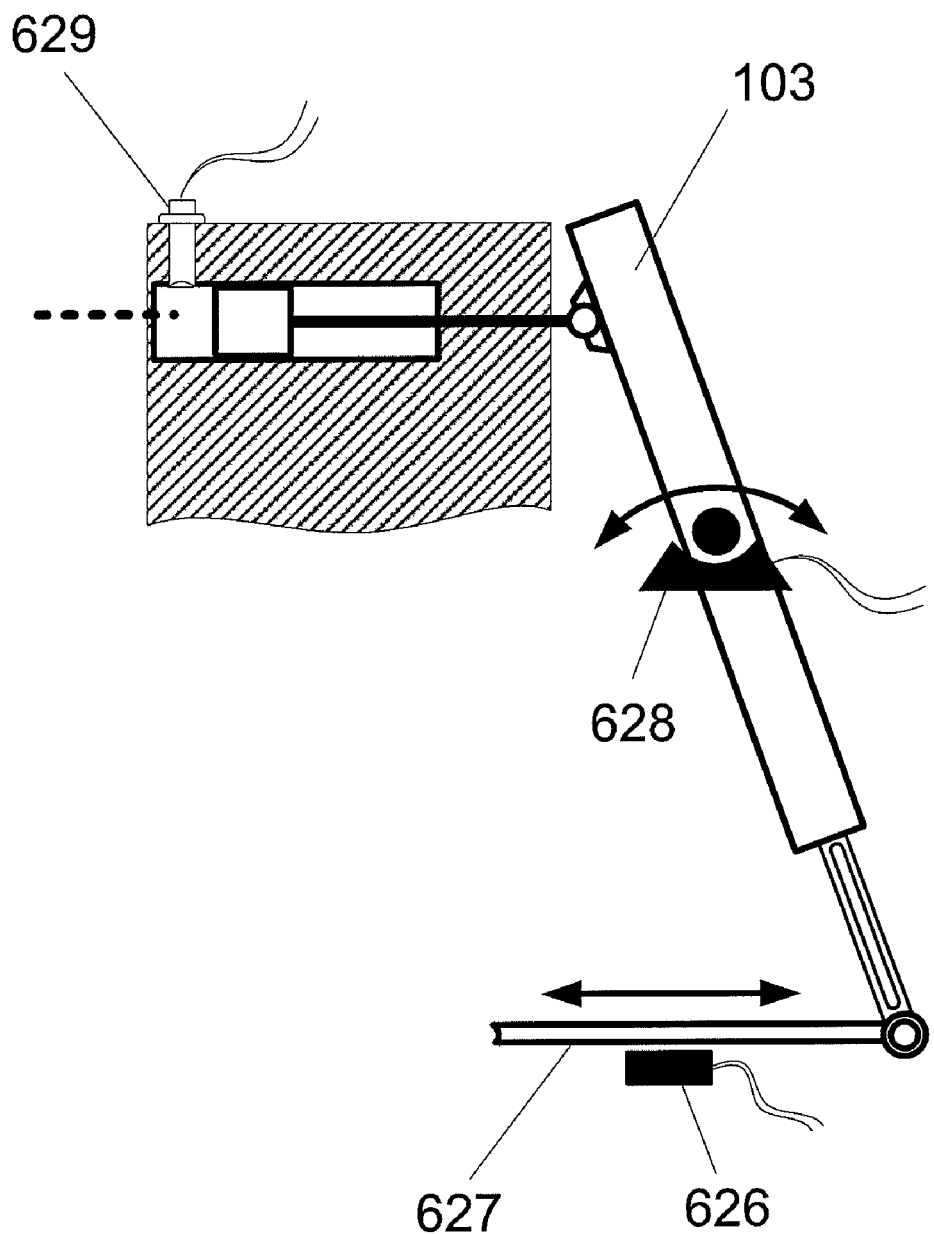
FIG. 6 is a schematic drawing of a sensor arrangement usable in conjunction with an electric actuator in accordance with the disclosed principles.

In each case mentioned above, it is desirable, although not critical, to employ a sensor to resolve the position or affect of the swash plate 103. In this manner, the actuating electric signal can be adapted to provide precisely the desired notion or torque of the swash plate 103, regardless of changes in the response of the actuating element, e.g., via wear and tear, battery age, etc. Thus, as shown in FIG. 6, a linear sensor 626 may be located on the linking rod 627 in an example. In this way, the translation of the linking rod 627 may be detected and resolved to determine whether the swash plate 103 is in the desired position. Additionally or alternatively, a rotary encoder or resolver 628 may be used to directly measure the angular position of the swash plate 103. Moreover, a circuit pressure sensor 629 is provided in an example to facilitate closed loop torque control as will be described in greater detail below.

There are 3 ways to operate the control system within the disclosed principles. The first is speed control, the second is open loop torque control and the third is closed loop torque control. During closed loop operation, the electric motors are speed controlled, and the control system performs closed loop iterative control based on the hydraulic circuit pressure. In this mode, it is important to have a circuit pressure sensor to sense the hydraulic pressure generated by the pump 101. In particular, the torque generated at the output 111 will be reflected in the internal circuit pressure.

Figure 7:
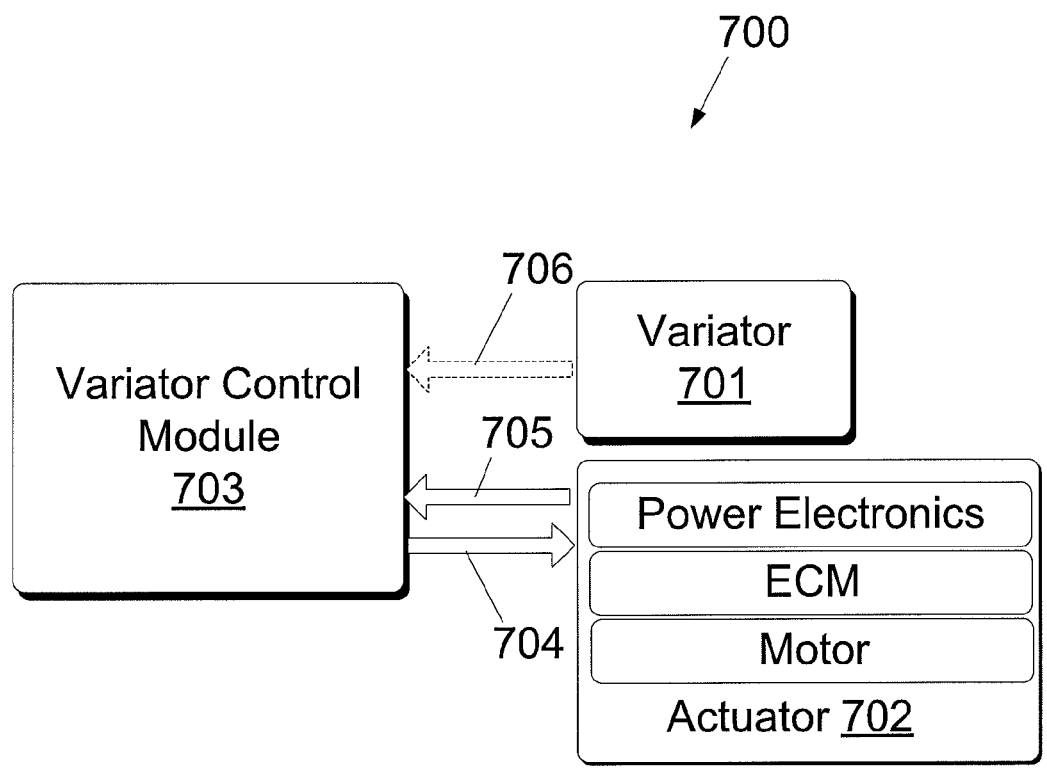
FIG. 7 is a schematic drawing of a variator control architecture in accordance with the disclosed principles.
Figure 8:
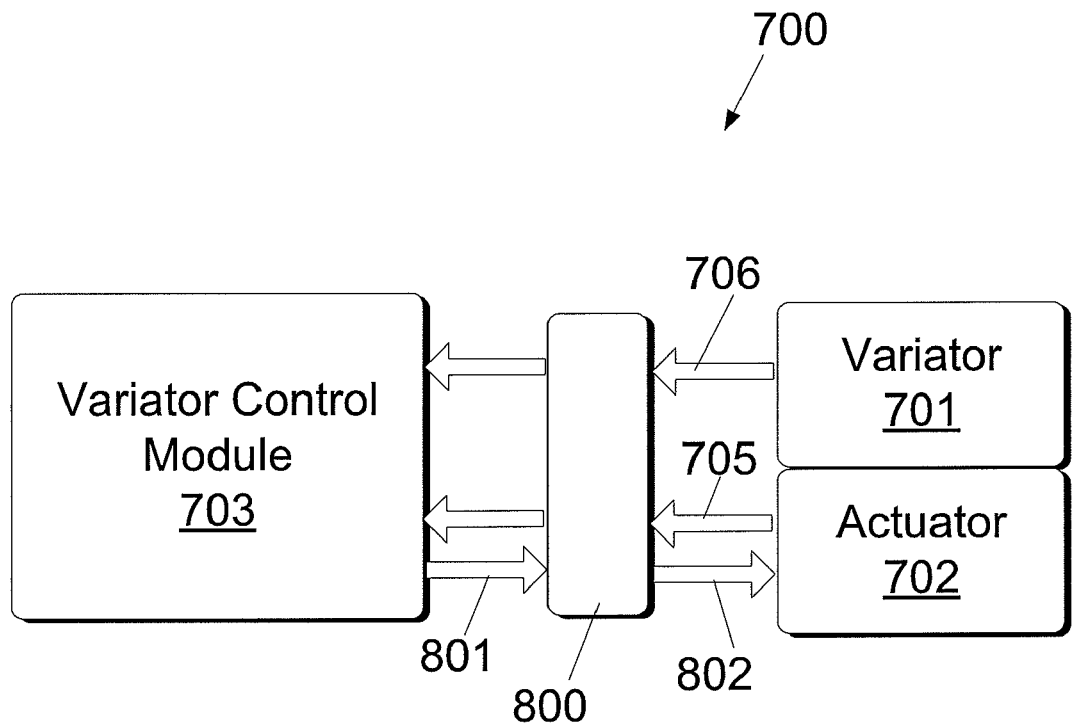
FIG. 8 is a schematic drawing of an alternative variator control architecture in accordance with the disclosed principles.

The electrical signals used to drive the electric motors for actuation of the swash plate 103 as described above are different from the electric signals used to drive the solenoid valves of a traditional actuator. However, the overall control architecture may be similar. FIG. 7 shows an exemplary control system 700 for controlling a variator 701 having an electronic swash plate actuator 702. In overview, the actuator 702 includes power electronics, an ECM, and an electric motor. The control system 700 includes a variator control module 703 for sending an actuation signal 704 (e.g., a speed command or torque command) to the actuator 702. The actuation signal 704 is received by the ECM, which may execute vector control or another control strategy, and send out a gating signal to switch the power electronics, which, as noted above, may lie across the DC bus. The switches signals control the electric motor to manipulate the swash plate (e.g., 103) of the variator 701. A feedback signal 705 may be provided from one or more sensors associated with the actuator 702 and/or from one or more sensors, e.g., a circuit pressure sensor, associated with the variator 701.

In an alternative architecture, the electronic actuator such as described in FIGS. 2-6 above is adapted as a retrofit to a system previously having an ordinary hydraulic actuator. In this case, if it is desired to leave the electronics unchanged except for modular additions, a translation module 800 is provided between the variator control module 703 and the actuator 702. The translation module 800 receives one or more solenoid drive signals 801 from the variator control module 703 and translates them to electric motor drive signals 802 to drive the motor or motors of the actuator 702. The one or more sensor signals 705 are provided to the translation module 800 and/or to the variator control module 703. As noted above with respect to FIG. 7, a feedback

INDUSTRIAL APPLICABILITY

The present disclosure is applicable to machines having one or more hydraulic pumps for which improved pump response is desired. In these types of machines, there are generally hydraulic actuators for the variator swash plate. However, such systems have a slower than optimal response, making accurate real time power control difficult. In keeping with the disclosed principles, an electric actuator is employed to improve the frequency response of the actuator.

In keeping with the disclosed principles, a hydraulic pump system for improved frequency response includes a hydraulic variator with a pump and a motor. The pump includes a variable angle swash plate, and the system further includes an electric actuator for controlling an angle of the angle swash plate, thereby controlling the motor. The electric actuator for controlling the angle of the variable angle swash plate may comprise a linear electric motor or a rotary electric motor. In an example, the rotary electric motor tilts the swash plate by applying a torque to the swash plate at a point away from its tilt axis. In another example, the rotary electric motor tilts the swash plate via a worm drive.

As noted above, it is desirable in some cases to control the torque applied to the swash plate rather than the angle thereof. Thus, in an embodiment, the torque applied to the swash plate is controlled and the angle of the swash plate need not be maintained constant. To this end, an electric actuator acts through a lever arm to apply the appropriate torque to the swash plate. In another embodiment of the invention, wherein either the torque or the angle of the swash plate is controlled, a motor shaft, or the output shaft of a gear box driven by the motor, is attached at the pivot axis of the swash plate. The motor then, directly or through the gear box, applies the prescribed torque or adjusts the swash plate to the prescribed angle.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A hydraulic power system having improved frequency response, the hydraulic power system comprising:
   a hydraulic variator having a hydraulic pump and a hydraulic motor, wherein the pump includes a variable angle swash plate movable about a tilt axis that is perpendicular to an axis of rotation of the pump; and
   an electric actuator for controlling a torque of the hydraulic motor by controlling the force applied to the variable angle swash plate, regardless of the angle of the variable angle swash plate, thereby controlling the motor output torque.

2. The hydraulic power system having improved frequency response according to claim 1, wherein the electric actuator for controlling a torque of the hydraulic motor comprises a linear electric motor.

3. The hydraulic power system having improved frequency response according to claim 1, wherein the controlling a torque of the hydraulic motor comprises a rotary electric motor.

4. The hydraulic power system having improved frequency response according to claim 3, wherein the rotary electric motor is adapted to tilt the swash plate by applying a torque to the swash plate at its tilt axis.

5. The hydraulic power system having improved frequency response according to claim 3, wherein the rotary electric motor is adapted to tilt the swash plate by applying a torque to the swash plate at a point away from its tilt axis.

6. The hydraulic power system having improved frequency response according to claim 5, wherein the rotary electric motor applies a torque to the swash plate via a worm drive.

7. A hydraulic variator for receiving input power and for providing output power, and for controllably altering one or more characteristics of the provided output power, the variator comprising:
   a hydraulic pump including a variable angle swash plate movable about a tilt axis that is perpendicular to an axis of rotation of the pump;
   a hydraulic motor linked to the hydraulic pump and hydraulically driven by the hydraulic pump; and
   an electric actuator for controllably applying a calculated torque to the variable angle swash plate, thereby controlling the motor output torque.

8. The hydraulic variator according to claim 7, wherein the electric actuator for controllably applying a calculated torque to the variable angle swash plate comprises a linear electric motor.

9. The hydraulic variator according to claim 7, wherein the electric actuator for controllably applying a calculated torque to the variable angle swash plate comprises a rotary electric motor.

10. The hydraulic variator according to claim 7, wherein the hydraulic pump comprises a plurality of pistons in respective chambers, each piston being cyclically translated within its chamber via motion of a member across the swash plate.

11. The hydraulic variator according to claim 10, wherein the plurality of pistons in respective chambers, when cyclically translated within its chamber, pressurizes hydraulic fluid in a hydraulic circuit linked to the hydraulic motor.

12. The hydraulic variator according to claim 11, further including at least one pressure sensor to sense a pressure in the hydraulic circuit.

13. The hydraulic variator according to claim 12, further including a controller to control the electric actuator based at least in part on the sensed pressure in the hydraulic circuit.

14. The hydraulic variator according to claim 9, wherein the rotary electric motor is adapted to tilt the swash plate by applying a torque to the swash plate at its tilt axis.

15. The hydraulic variator according to claim 14, wherein the rotary electric motor tilt the swash plate by applying a torque to the swash plate through a gear box.

16. The hydraulic variator according to claim 9, wherein the rotary electric motor is adapted to tilt the swash plate by applying a torque to the swash plate at a point away from its tilt axis.

17. The hydraulic variator according to claim 16, wherein the rotary electric motor applies a torque to the swash plate via a worm drive.

\* \* \* \* \*